(12) United States Patent
Chittaro et al.

(10) Patent No.: US 11,132,335 B2
(45) Date of Patent: Sep. 28, 2021

(54) SYSTEMS AND METHODS FOR FILE FINGERPRINTING

(71) Applicant: Interset Software, Inc., Santa Clara, CA (US)

(72) Inventors: Ron Chittaro, Ottawa (CA); Eric Rosenquist, Ottawa (CA); Kevin Goodman, Ottawa (CA); Shaun Pilkington, Ottawa (CA)

(73) Assignee: Interset Software, Inc.

( * ) Notice: Subject to any disclaimer, the term of this patent is extended or adjusted under 35 U.S.C. 154(b) by 221 days.

(21) Appl. No.: 16/217,688

(22) Filed: Dec. 12, 2018

(65) Prior Publication Data

US 2019/0188184 A1   Jun. 20, 2019

Related U.S. Application Data

(60) Provisional application No. 62/597,624, filed on Dec. 12, 2017.

(51) Int. Cl.
*G06F 16/14* (2019.01)
*G06F 16/18* (2019.01)
*G06F 16/13* (2019.01)

(52) U.S. Cl.
CPC .......... *G06F 16/152* (2019.01); *G06F 16/137* (2019.01); *G06F 16/1873* (2019.01)

(58) Field of Classification Search
USPC ........................................................ 707/758
See application file for complete search history.

(56) References Cited

U.S. PATENT DOCUMENTS

| | | | |
|---|---|---|---|
| 6,389,403 B1 * | 5/2002 | Dorak, Jr. ............... | G06F 21/10 705/51 |
| 6,505,160 B1 | 1/2003 | Levy | |
| 6,778,667 B1 * | 8/2004 | Bakhle .................. | H04L 9/3239 380/29 |
| 6,952,737 B1 * | 10/2005 | Coates .................. | G06F 3/0607 709/229 |
| 7,266,555 B1 * | 9/2007 | Coates .................. | G06F 16/172 707/827 |
| 7,415,731 B2 * | 8/2008 | Carpentier .............. | H04L 63/12 726/30 |
| 7,428,540 B1 | 9/2008 | Coates | |
| 8,290,918 B1 * | 10/2012 | Ioffe ....................... | G06F 16/41 707/698 |
| 8,452,731 B2 * | 5/2013 | Preslan ............... | G06F 11/1453 707/652 |
| 8,655,878 B1 * | 2/2014 | Kulkarni ................. | G06F 16/43 707/736 |
| 8,667,273 B1 * | 3/2014 | Billstrom ............ | H04L 63/0428 713/165 |
| 8,769,296 B2 | 7/2014 | Etchegoyen | |
| 8,832,466 B1 * | 9/2014 | McGregor, Jr. ....... | H04L 9/0618 713/193 |
| 9,152,706 B1 * | 10/2015 | Claudatos ........... | G06F 16/7837 |
| 9,171,096 B2 * | 10/2015 | Palanisamy ........... | G06F 16/972 |
| 9,792,316 B1 * | 10/2017 | Cremelie ............ | G06F 11/1453 |
| 9,804,966 B1 * | 10/2017 | Sadanandan ........ | G06F 12/0862 |

(Continued)

*Primary Examiner* — Cam Linh T Nguyen

(57) ABSTRACT

A file fingerprint may be provided as a composite of multiple hashes of different portions of the file. The composite hash allows the fingerprinting process to be interrupted while still providing information about a likely hood of two files being identical.

20 Claims, 6 Drawing Sheets

(56) References Cited

U.S. PATENT DOCUMENTS

| | | | | |
|---|---|---|---|---|
| 10,102,352 B2* | 10/2018 | Butcher | | G06F 21/10 |
| 10,424,406 B2* | 9/2019 | Jafer | | G06F 21/6254 |
| 10,491,398 B2* | 11/2019 | Heurich | | H04L 63/12 |
| 2002/0126872 A1* | 9/2002 | Brunk | | H04N 19/467 |
| | | | | 382/100 |
| 2004/0019658 A1* | 1/2004 | Plastina | | G06F 16/40 |
| | | | | 709/217 |
| 2004/0073617 A1* | 4/2004 | Milliken | | G06F 21/562 |
| | | | | 709/206 |
| 2006/0062426 A1* | 3/2006 | Levy | | G11B 20/00086 |
| | | | | 382/100 |
| 2006/0136723 A1* | 6/2006 | Taylor | | G06T 1/0028 |
| | | | | 713/168 |
| 2007/0156726 A1 | 7/2007 | Levy | | |
| 2007/0162596 A1 | 7/2007 | Sekiguchi | | |
| 2007/0174059 A1 | 7/2007 | Rhoads | | |
| 2007/0244877 A1* | 10/2007 | Kempka | | G06F 16/10 |
| 2007/0245119 A1* | 10/2007 | Hoppe | | H04L 45/7453 |
| | | | | 711/216 |
| 2009/0158318 A1* | 6/2009 | Levy | | G06F 21/36 |
| | | | | 725/32 |
| 2009/0171990 A1* | 7/2009 | Naef, III | | G06Q 10/06 |
| 2011/0055471 A1* | 3/2011 | Thatcher | | G06F 3/0608 |
| | | | | 711/114 |
| 2012/0089648 A1* | 4/2012 | Kozan | | G11B 20/00086 |
| | | | | 707/802 |
| 2013/0067238 A1* | 3/2013 | Homme | | G06F 21/51 |
| | | | | 713/189 |
| 2013/0097696 A1 | 4/2013 | Baker | | |
| 2013/0276114 A1* | 10/2013 | Friedrichs | | G06F 21/567 |
| | | | | 726/23 |
| 2014/0108786 A1* | 4/2014 | Kreft | | G06F 21/335 |
| | | | | 713/156 |
| 2014/0250066 A1* | 9/2014 | Calkowski | | H04L 67/06 |
| | | | | 707/624 |
| 2014/0250142 A1* | 9/2014 | Pradhan | | G06F 16/2453 |
| | | | | 707/765 |
| 2014/0317666 A1* | 10/2014 | Chiarulli | | H04H 60/06 |
| | | | | 725/114 |
| 2014/0337950 A1* | 11/2014 | Yang | | H04L 9/3236 |
| | | | | 726/7 |
| 2014/0358938 A1* | 12/2014 | Billmaier | | G06F 16/284 |
| | | | | 707/747 |
| 2015/0350222 A1 | 12/2015 | Hashimoto | | |
| 2016/0360012 A1* | 12/2016 | Zholudev | | H04L 67/20 |
| 2017/0154042 A1* | 6/2017 | Meyer | | G06F 16/9014 |
| 2017/0193003 A1* | 7/2017 | Vijayan | | G06F 3/0641 |
| 2018/0046889 A1* | 2/2018 | Kapinos | | H04L 9/3239 |
| 2018/0076957 A1* | 3/2018 | Watanabe | | G06Q 20/3829 |
| 2018/0246649 A1* | 8/2018 | Datar | | G06F 3/068 |
| 2018/0336263 A1* | 11/2018 | Bensberg | | G06F 16/284 |

\* cited by examiner

602a

| File Fingerprint | |
|---|---|
| Fingerprint Version | V1.235.0021 |
| Timestamp | 1509646233 |
| File ID | 58af9E |
| First Pass Hash | 7VQmaF<GO2F)rl;@<6) |
| Second Pass Hash | ;e9HWDIal/@<6K4BOPsq |
| Block #1 Hash | 6>URMCEOiV+@op^BE |
| Block #2 Hash | e9HWDIal!Ci<g!+@op^BF |
| Block #3 Hash | (L_DA0>i0Bl8$0Bm9sl |
| Block #4 Hash | AoDg4FD)e+Ci<g!Bl7Pj |

604a: Fingerprint Version, Timestamp, File ID
606a: First Pass Hash
608a: Second Pass Hash
610a: Block #1 Hash
612a: Block #2 Hash
614a: Block #3 Hash
616a: Block #4 Hash

| File Fingerprint | |
|---|---|
| Fingerprint Version | V1.235.0021 |
| Timestamp | 1509646631 |
| File ID | 58af9E |
| First Pass Hash | 7VQmaF<GO2F)rl;@<6) |
| Second Pass Hash | ;e9HWDIal/@<6K4BOPsq |
| Block #1 Hash | 6>URMCEOiV+@op^BE |
| Block #2 Hash |  |
| Block #3 Hash |  |
| Block #4 Hash |  |

604b: Fingerprint Version, Timestamp, File ID
606a: First Pass Hash
608b: Second Pass Hash
610b: Block #1 Hash
612b: Block #2 Hash
614b: Block #3 Hash
616b: Block #4 Hash

FIG. 6B

SYSTEMS AND METHODS FOR FILE FINGERPRINTING

CROSS-REFERENCE TO RELATED APPLICATIONS

The present application claims priority from U.S. Provisional Patent Applications No. 62/597,624 filed Dec. 12, 2017, the entirety of which is hereby incorporated by reference for all purposes.

TECHNICAL FIELD

The current disclosure relates to file identification and in particular to generating fingerprints for files.

BACKGROUND

File tracking can be used to identify computer files that particular users access. Identifying that a user has accessed a file, which may be to read from and/or write to the file, does not provide any details about the content of the file that was accessed. The content of a file can be tracked by taking a snapshot of the file after it is accessed; however taking a snapshot of the file can increase the storage requirements as well as the Input/Output (I/O) load of the storage system. Rather than taking a snapshot copy of the file contents, a cryptographic hash may be taken of the file contents, which provides a relatively small string that may be considered as a unique identifier of the file contents. While a hash of file contents may improve the storage requirements for tracking file content, it increases the computational cost to generate the hash.

BRIEF DESCRIPTION OF THE DRAWINGS

Further features and advantages of the present disclosure will become apparent from the following detailed description, taken in combination with the appended drawings, in which:

FIGS. 6A and 6B depict illustrative fingerprints of a file.

DETAILED DESCRIPTION

Figure 1:
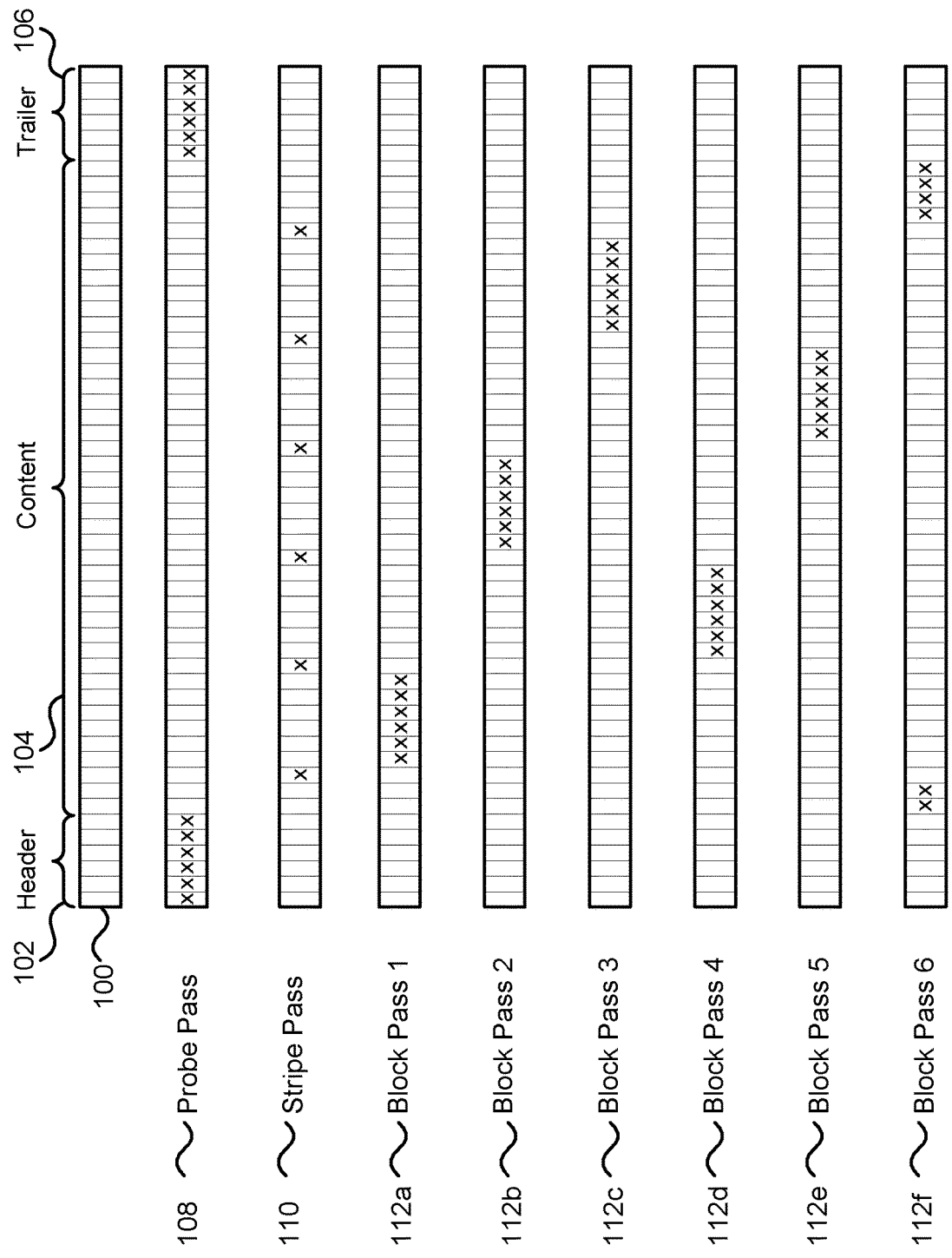
FIG. 1 depicts a file and read profile for different hash passes.

In accordance with the present disclosure there is provided a method of fingerprinting a file comprising: reading metadata of the file; determining a read profile for the file comprising a nominal number of hash passes for the file, wherein the nominal number of hash passes is at least two; generating one or more hashes of the file according to the read profile; and generating a file fingerprint comprising the nominal number of hash passes the one or more generated hashes.

In accordance with the present disclosure there is also provided a method of comparing a first file fingerprint to a second file fingerprint, each of the first file fingerprint and the second file fingerprint comprising an indication of a nominal number of hash passes and one or more generated hashes, the method comprising: comparing the nominal number of hash passes of each of the first file fingerprint and the second file fingerprint; if the nominal number of hash passes are not the same, determining that the file fingerprints do not match; and if the nominal number of hash passes match, comparing the one or more generated hashes of each of the first file fingerprint and the second file fingerprints to provide a likelihood that the first file fingerprint and the second file fingerprint are identical.

In accordance with the present disclosure there is also still yet provided a system of comparing a first file fingerprint to a second file fingerprint, each of the first file fingerprint and the second file fingerprint comprising an indication of a nominal number of hash passes and one or more generated hashes, the system comprising: a processor for executing instructions; and a memory storing instructions, which when executed configure the system to: compare the nominal number of hash passes of each of the first file fingerprint and the second file fingerprint; if the nominal number of hash passes are not the same, determine that the file fingerprints do not match; and if the nominal number of hash passes match, compare the one or more generated hashes of each of the first file fingerprint and the second file fingerprints to provide a likelihood that the first file fingerprint and the second file fingerprint are identical.

When dealing with computer files, a common need is to have some assurance a file and its copy are identical in content. One technique for doing this involves the use of a cryptographic algorithm called a hash function which produces a very small encoding—a hash—that represents the content of the original file. Because a file hash is small relative to the size of the file itself, it is useful in other situations including where the files themselves are not always available yet it is still desirable to determine if two files are the same. As described further below, a file fingerprinting system can monitor file access, generate a file fingerprint and store the file fingerprint as a record of file contents when the file was accessed. The fingerprint can be used later to evaluate which files were the same and which ones were different or were modified, regardless of what the files might be named, where they might be located or if they even still exist.

As described in further detail below, the file fingerprint may comprise a plurality of hashes from different portions of the file. Generating a file's fingerprint after a file has been accessed can be difficult if the file being fingerprinted is large and/or accessed via a slow I/O connection, such as a slow network connection. If the fingerprint requires hashes of the entire file, the entire contents of the file would need to be retrieved in order to hash the file, which would require that the file remain static and unchanged for a possibly significant amount of time. Also, if the file storage location is shared by many computers, each with its own unique file access characteristics, the additional load caused by the computers all re-reading files to compute file hashes can be prohibitive. The file fingerprinting described further below generates hashes of a file from multiple different portions of the file. If the computing resources at the computer device are limited, for example due to a slow network connection or due to other computational requirements at the computer device, not all of the portions of the file need to be hashed as part of the fingerprint. Although a fingerprint with only partial file hashes may not be sufficient to positively identify files as being identical; fingerprints with partial hashes may be sufficient to provide some level of assurance that files are the same.

The fingerprint process described herein can provide various levels of assurance that the content of two files are identical. For example, if the two fingerprints comprise hashes of the complete file contents for both files and both fingerprints match, the file contents are considered identical. If one or more of the fingerprints does not include all of the hashes, the fingerprints may only provide a partial match, and the level of confidence will depend upon the hashed portions that were matched in the fingerprint.

A file fingerprint is a composite hash representation of the state of a file at a particular point in time so that by comparing file fingerprints of one or more files it is possible to determine if the files themselves are identical, or if it is at least likely that they are identical.

The file fingerprinting described herein is interruptible, so that meaningful results can be obtained even if the entire file contents are not hashed as part of the fingerprint. Since the fingerprint process can be interrupted, the fingerprinting process's impact on performance, or a user's perception of performance, can be limited. The interruptible fingerprinting process if completed provides a fingerprint that can be used to determine if two files are identical. If the fingerprinting process is interrupted, for example to reduce processing load on a user's device computing the fingerprint, the resulting partial fingerprint may not be used to determine if two files are identical; however, it can provide an indication of the likelihood of two files being identical. The interruptible fingerprinting process is able to place less of a computing burden on the user's machine than might otherwise be necessary to compute a complete fingerprint while still providing potentially useful information regarding the likelihood two files are the same. Less computational burden allows the fingerprinting process to keep up with file access events in real-time while still providing a computer that is responsive to the user. In addition to interrupting the fingerprinting process to reduce a computational burden on the user's computer, it is also possible to interrupt the fingerprinting process to reduce an I/O burden on a file system, which may be particularly useful for shared file resources.

The fingerprinting process uses hashes of different file portions that are performed in several successive passes and that may be interrupted at any time while still producing a usable fingerprint using the completed hashes. This interruption may be accidental such as due to loss of a network connection over which the file is accessed or it might be deliberate for the purpose of reducing load on a shared file server or the computer computing the hashes or for limiting the time required to compute the complete fingerprint. The file fingerprints are generated from composite hashes of file contents. The hash computation is interruptible, and as such it is important to be able to compare two fingerprints regardless of the number of complete hash passes each fingerprint comprises. The file fingerprint is collision and tamper resistant. Because the hash computation is interruptible, additional steps can be taken to be resistant to collisions and tampering. These additional measures may include striping the file contents for one hash pass so that that the hash is of small stripes taken from across the entire file. Subsequent passes may be taken from non-sequential areas of the file. A pseudo-random, hash-based offset can be incorporated into the blocking structure of the file portions used for hashing in a fingerprint to increase unpredictability and so improving the tamper resistance. Even though the file fingerprint is not intended as a security measure, it is preferable when dealing with an incomplete fingerprint, that the un-hashed portions of the file not be easily exploitable. It is desirable that it not be easy for an attacker to be able to reliably make changes to the file that go undetected. The file fingerprint may also be content adaptive, so that the file size and header of the file are used to assess the file format and select a preferred algorithm, parameters and blocking structure for the hashing that follows.

Broadly, the fingerprint is created by determining a read profile of the file, which is used to guide the generation of the fingerprint, including determining the file portions for hashing for the different passes. Successive hash passes are performed in accordance with the read profile. The passes may be interrupted and as such, only a portion of the hashes in a complete fingerprint may be computed. The hashes may be concatenated into a single composite hash or combined into a file or structure for the fingerprint. The fingerprint may include information on the hash algorithm used, a version ID as well as the total number of passes defined by the read profile.

When generating a fingerprint, the file being fingerprinted is accessed to determine file information such as its length and file type. The file metadata can be used to generate a read profile for the file that specifies the different portions of the file that will be read for use in generating different hashes.

FIG. 1 depicts a file and read profile for different hash passes. As depicted, a file 100 is stored as a number of bytes and may have a header 102, content 104 and a trailer 106. During the file fingerprinting process the file 100, or at least portions of the file, are read. During a first probing pass 108, the file size and header, and possibly the trailer, are read and hashed. The probe pass allows basic analysis of the file content, which can be used to potentially optimize further fingerprint processing. The probe pass also provides a very quick hash of part of the file, so in the event of a transient file, bad connection, etc. that prevents processing of further hashes there is at least a basic file hash. The probe pass can also be used to assess hash throughput to determine the viability of further read passes. After the probe pass 108, a stripe pass 110 is performed which reads small stripes of data spread out across the entire file. The stripe pass 110 may exploit the fact that most data files are structured for locality and tend to group related information together. By quickly reading bands of data from across the file the likelihood of hashing a section that has changed is increased. The specific locations of the stripes may be determined by the block sections in which they are contained. Once the stripe pass is completed, a number of block passes 112a-112f may be performed. Each block pass reads a particular block and hashes the block.

A file can have a number of sections with each section starting at an offset from the start of the file. The file may be split evenly into sections or it may be done non-linearly. A stripe offset can be provided that indicates where the stripe begins relative to the beginning of the section. The stripe offset may be pseudo-random hash-based, which can improve tamper resistance by reducing the predictability of where the stripe portions are read from. The stripe offsets may be the same for each section, or one or more sections may use different stripe offset values. The width of each stripe may be provided as a predetermined value or based on details of the file. For example, a nominal stripe width can be determined by a fixed configuration; however, for large file sizes, the stripe width may be increased to ensure coverage of the entire file. The width of a block may be defined based on different aspects including for example the file size, a maximum number of blocks per file, a minimum number of blocks per file or other characteristics. A block may wrap around the file, as depicted in block pass 112f. Sections, comprising a stripe and block, may be added as a file size increases. If the maximum number of sections is reached, the block and/or stripe size may be increased in order to provide fingerprint coverage of the entire file.

It may not always be possible for fingerprint processing to cover an entire file. Optimizations can be done to give priority to sections of the file that are likely to have maximum variability. The linearity of the blocking structure may be adjusted to maximize the amount of file coverage that can be achieved when calculation time available is limited for any reason.

It is possible to prioritize file sections for maximizing variability. The ZIP-based family of archive files which include JAR, Office Open XML, OpenDocument ODF, and others provide a simple example of how content-based optimizations can be used. For these files, the archive's directory is located at the end of the file and so the probe phase can be extended to include the file trailer 106 as depicted in FIG. 1 to ensure parts of the file with maximum variability are prioritized.

There may be several orders of magnitude differences in file sizes, and read performance, where read performance is a function of at least raw storage media access performance and inter-connect network performance. Because of this, better file coverage can often be achieved by using fingerprint sections with increasing sizes. Generally, the larger the file, the more it can benefit from increased section non-linearity.

Figure 2A:
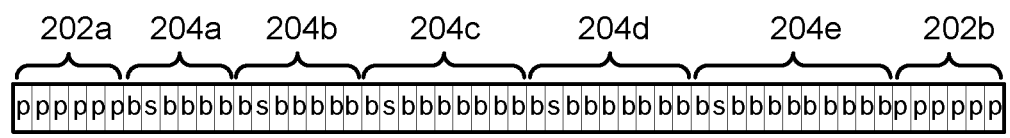
FIGS. 2A and 2B provide an illustrative file read profiles.
Figure 2B:
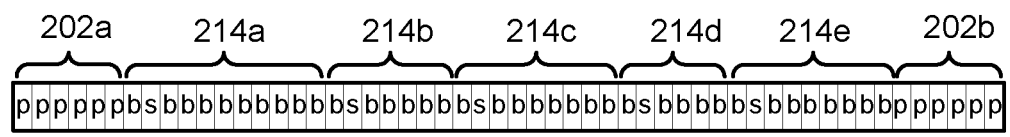

FIG. 2A provides an illustrative file read profile. As depicted in FIG. 2A, the header portion 202a and trailer portion 202b are processed in the probe pass, represented by 'p'. The content portion of the file is broken into sections 204a-204e of increasing size. Each section 204a-204e includes a stripe portion, represented by 's' and a block portion, represented by 'b'. The section lengths can be varied in a pseudo-random hashed based arrangement which increases the tamper resistance of the fingerprinting. FIG. 2B depicts a pseudo random approach in which the section lengths are pseudo random. Each section 214a-214e includes a stripe portion and a block portion.

The hashes of the different portions may be computed independently; however, in order to increase the collision resistance of the composite fingerprint, each hash may continue the hash state of previous hash.

The final file fingerprint representation is variable sized and may have three main parts. The first is a version ID that is used to ensure that incompatible fingerprint methods or parameterizations do not successfully compare. The version ID also allows a client to determine when an unsuccessful comparison is due to incompatibility of the two fingerprints as opposed to due to the fingerprints being of different files. The version ID may be used to allow an "invalid" fingerprint to be explicitly represented. For example if the fingerprint is invalid, the version ID may be set to 'invalid' or another value associated with invalid fingerprints. The fingerprint further includes a nominal number of passes for the file's fingerprint. The nominal number of passes value records the number of passes that the generated read profile would perform if enough time is allowed for the complete fingerprint to be generated. The nominal number of passes value allows a client to determine if a particular fingerprint is a complete or partial fingerprint. Further, the nominal number of passes can also ensure that when comparing fingerprints, two fingerprints that collide only at a lower pass number do not match. For example, if one fingerprint takes 8 passes while another takes 4 and only the first 3 passes of both were completed and are the same, the fingerprints will not match. The fingerprint includes the composite hash that may be a concatenation of each completed pass's hash. The composite hash will include at least the one hash based on the probe pass. Each hash of the composite hash is fixed in size to support comparisons. If the fingerprints include a maximum number of sections, the size of the fingerprint will also have a maximum size.

As an example, a fingerprint may be a variable sized ASCII string comprising a one byte string of ASCII characters 0-9 for the fingerprint Version ID, where 0 means "invalid,"; a one byte string of ASCII characters 1-9 for the nominal number of passes; and one or more concatenated, fixed width, string representations of the completed binary hashes, which may be in base64 or base85. In general, it is desirable to minimize the possible size of a fingerprint.

In determining if two fingerprints match, the version ID's are checked to see if they have the same version ID, the same nominal number of passes, and the completed hashes for each pass in both fingerprints are identical, for example the length of the comparison must be an integer multiple of the fixed width hash length.

The fingerprints described herein allow determinations of similarity probabilities between files to still be drawn even when all of the passes in the read profile were not completed for one or more of the files being compared. In contrast, a single hash of a file only allows a binary determination of two files being identical or different. Further, with single hashes, if a hash is not completed, it is not possible to make any comparison. The fingerprints described herein support a number of conclusions based on the comparison. If two fingerprints, whether they comprise partial or full hashes, are different, then the two files are guaranteed to be different. If partial fingerprints match, that is fingerprints that do not include all of the hashes specified in the nominal number of passes, then the files are at least close and there is a chance that they are the same. This behavior is conservative because possible matches can at least be investigated further. The more passes that match, the greater is the assurance that the files are identical.

Figure 3:
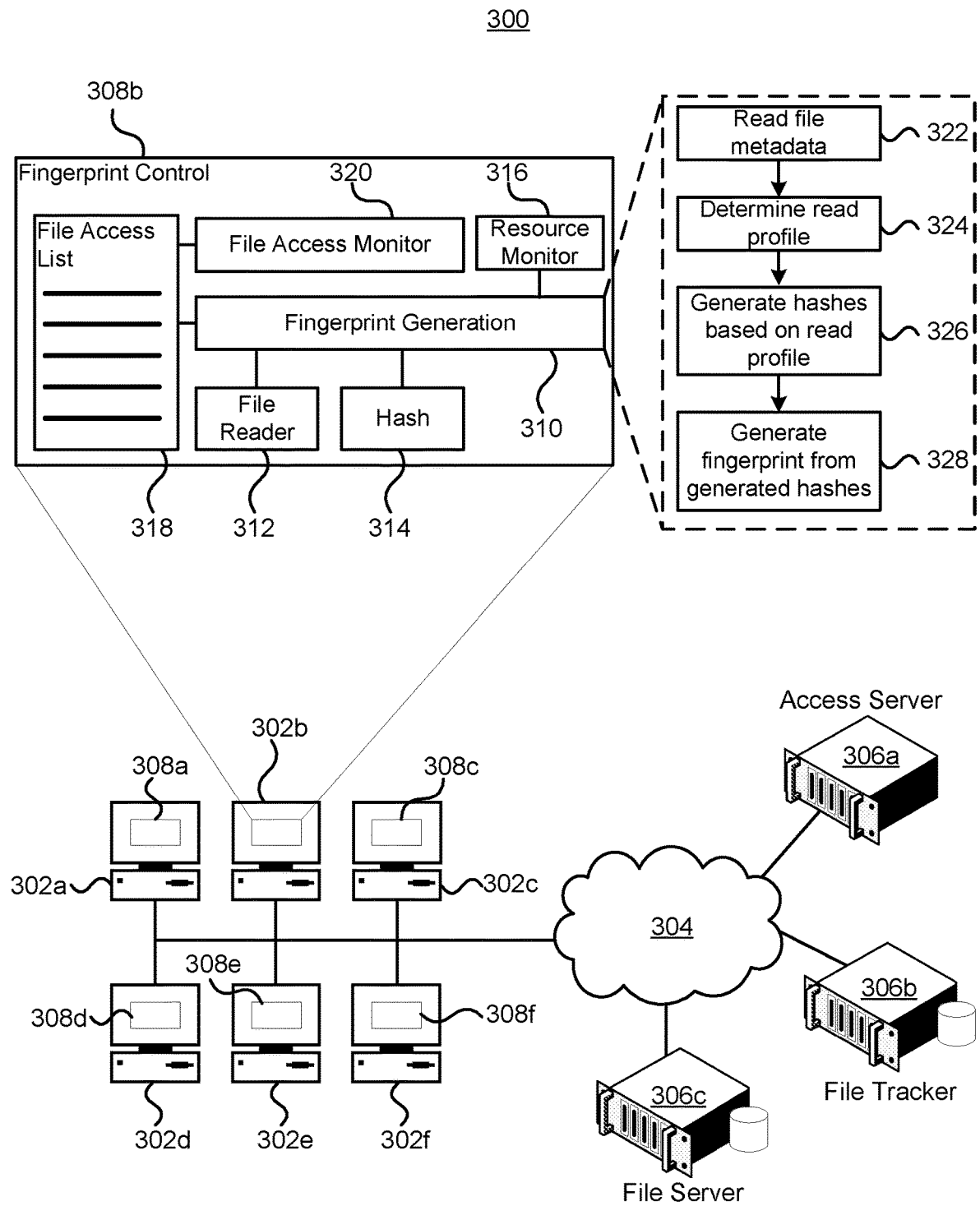
FIG. 3 depicts a system for fingerprinting files accessed by computer devices in a network environment in accordance with the present disclosure.

FIG. 3 depicts a system for fingerprinting files accessed by computer devices in a network environment in accordance with the present disclosure. The system 300 comprises a number of computer devices 302a-302f (referred to collectively as computers 302) that are communicatively coupled to a network 304. The network 304 is depicted broadly as a single network; however, the network 304 may comprise a plurality of interconnected networks such as a corporation's internal network as well as the internet. A number of computer servers 306a-306c (referred to collectively as servers 306) may be communicatively coupled to the network 304 and accessible to one or more of the computers 302. The servers may provide various functionality such as directory access control functionality, file server functionality, network monitoring and/or control as well as file tracking functionality.

The system 300 may comprise file fingerprinting functionality 308a-308f (referred to collectively as fingerprinting functionality 308) that fingerprints files accessed by the computers 302. Although the fingerprinting functionality 308 is depicted as being implemented on each of the computers 302, it is possible to implement the fingerprinting functionality 308 on other devices such as one or more servers.

Regardless of where the fingerprinting functionality 308 is implemented, it includes fingerprint generation functionality 310 that controls the fingerprinting process. The fingerprint generation functionality 310 may use file reading functionality 312 capable of reading file metadata and portions of a file, as well as hash functionality 314 that can generate hashes. In addition to generating file fingerprints the fingerprinting functionality 308 may also monitor computer resources to determine if the hashing process should be interrupted or stopped, for example due to a slow network connection, a received indication to stop the hashing process or other processing requirements on the computer. The fingerprint generation functionality 310 can generate a fingerprint for a file, and a file list 318 may provide an ordered list of files to fingerprint. The list 318 may be ordered based on a priority of fingerprinting the file, based on the time the file was accessed or other factors. The fingerprint functionality 308 may also include file access monitoring functionality 320 that monitors file access and when a file is accessed, or when the access is completed, the accessed file may be added to the file access list 318.

The fingerprint generation functionality 310 may retrieve a file from the file access list and generate a fingerprint for the file. Generating the fingerprint may include reading file metadata (322), determining a read profile (324) for the file that specifies the different locations within the file to use for the different hash passes. The fingerprint generation functionality may then generate hashes of file portions based on the read profile (326) and then generate the fingerprint from the one or more generated hashes (328).

Figure 4:
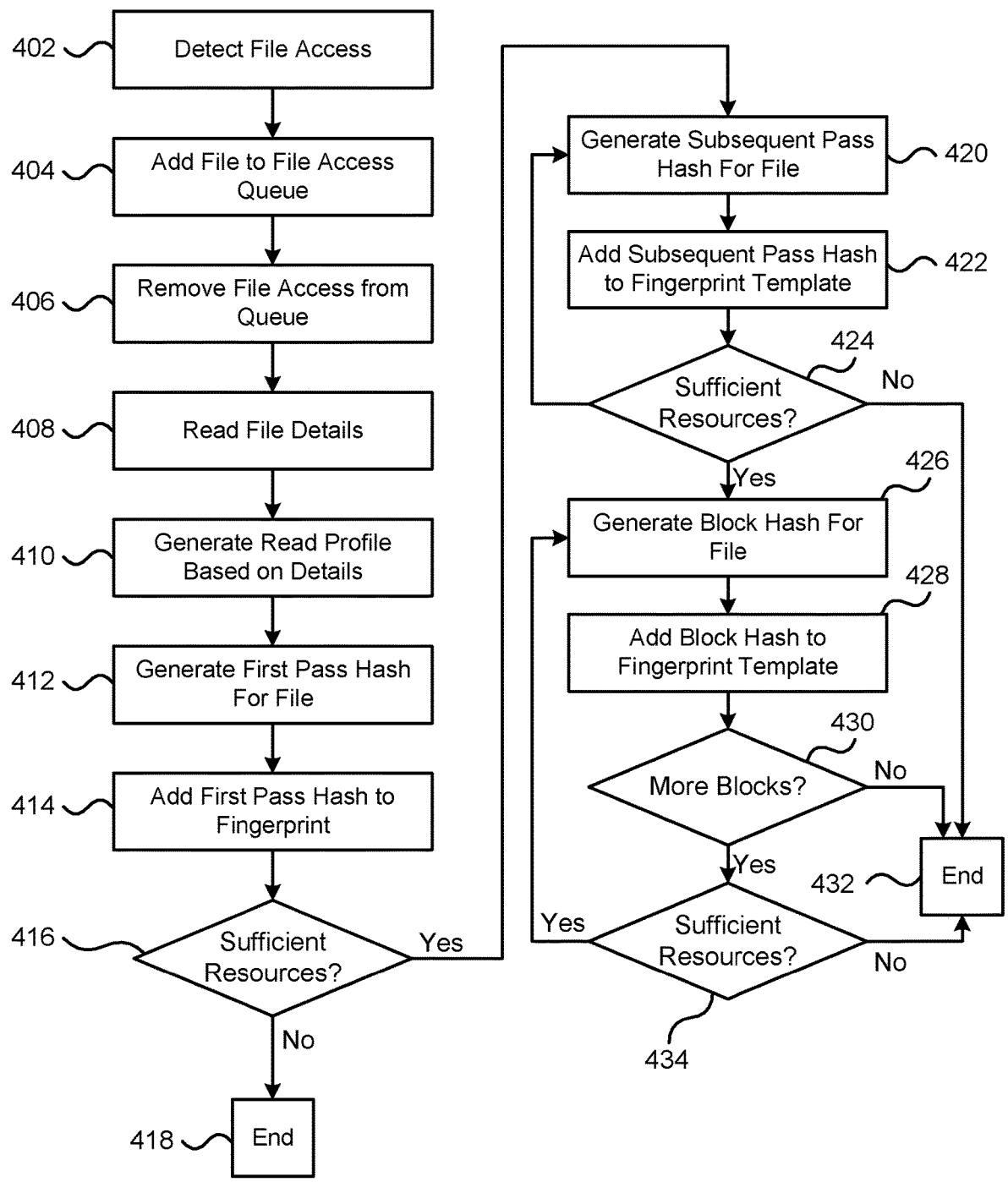
FIG. 4 depicts a method of fingerprinting a file in accordance with the present disclosure.

FIG. 4 depicts a method of fingerprinting a file in accordance with the present disclosure. The method 400 may be implemented by the fingerprint functionality 308 described above. The method detects file access (402) and adds the accessed file to a file access queue (404). A file is removed from the file access queue (406) and the file details of the file read (408), which can be used to generate the read profile of the file (410). Although described as using a queue to track files to be fingerprinted, it is possible to fingerprint files as they are accessed without using a queue. A fingerprint may be generated including a version ID and the nominal number of passes to be performed for the file. A first pass hashing of the file is performed according to the read profile (412) and the generated hash can be added to the fingerprint (414). The method then determines if there are sufficient computing resources, in terms of for example time taken or estimated time remaining, processing lag, processor load, memory resources, network bandwidth, and/or file I/O (416) to perform further hash passes. If there are not enough resources (No at 416) the fingerprint generation ends (418) and the fingerprint, which will only include the first pass hash, can be returned. If there are enough compute resources to continue the fingerprint generation (Yes at 416), then a subsequent stripe pass hash is generated (420) and added to the fingerprint (422). After generating the subsequent stripe pass hash, it is determined if there are sufficient resources (424) to continue the fingerprinting process. If there are not sufficient resources (No at 424) the fingerprinting process ends (432) and the fingerprint, which includes concatenated hashes from both the first and subsequent stripe passes, may be returned. If there are sufficient resources to continue the fingerprinting process (Yes at 424), a first block hash of the file is generated (426) and added to the fingerprint (428). After generating the block hash, it is determined if there are more blocks (430) to be generated for the fingerprint. If there are no more blocks (No at 430), the fingerprinting process stops (432) and the fingerprint may be returned. If there are more blocks (Yes at 430), it is determined if there are sufficient resources to continue with the fingerprinting process (434) and if there are not sufficient resources (No at 434), the process ends (432). If there are sufficient resources (Yes at 434), another block is hashed.

The above method 400 has described the fingerprinting process as checking whether or not there are sufficient computing resources after generating a hash. Rather than checking whether there are sufficient resources, it is possible to interrupt the process from an external process to terminate the hash process and generate the file fingerprint based upon the hashes completed.

Figure 5:
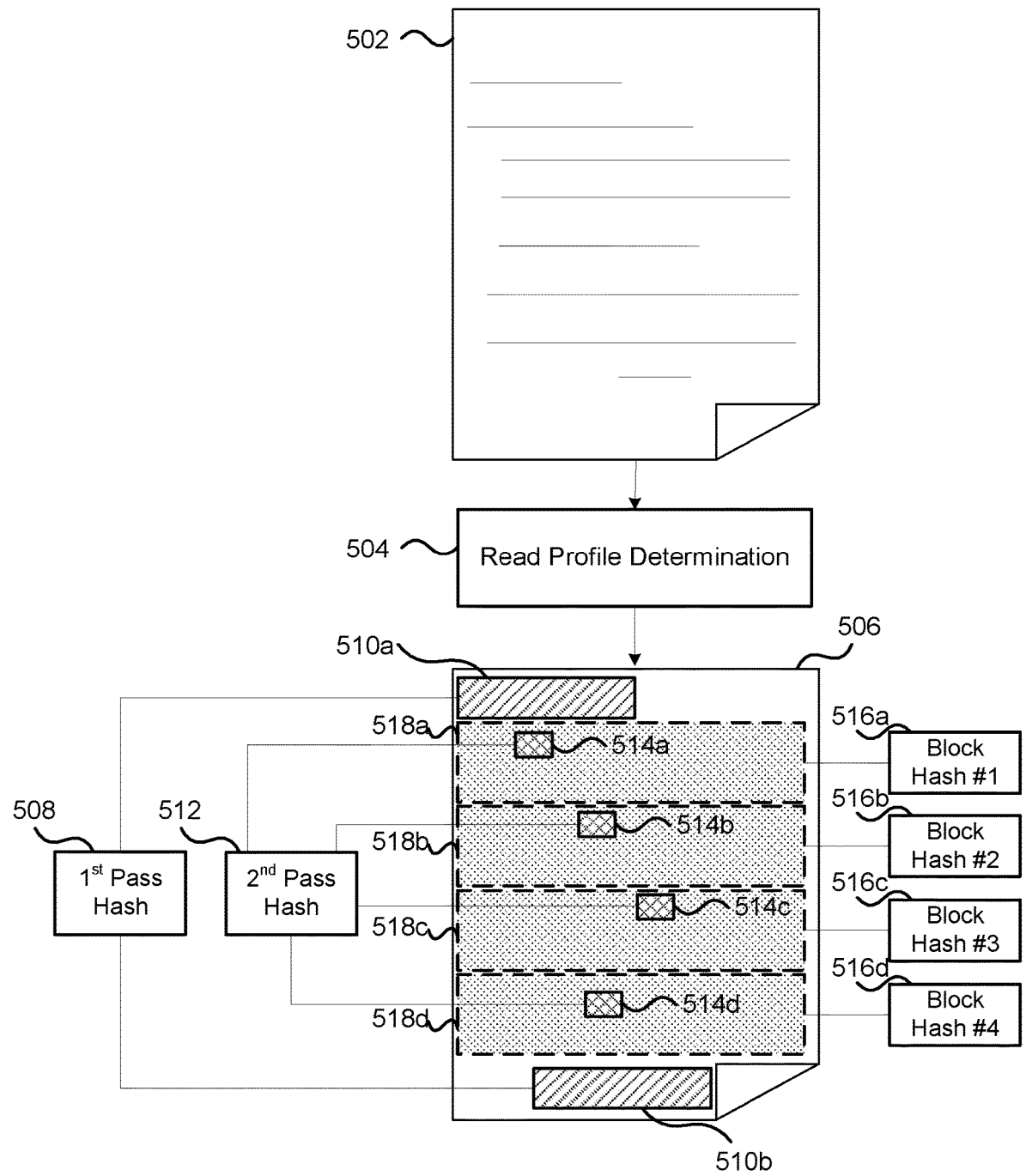
FIG. 5 depicts an illustrative file corresponding hash locations for fingerprinting the file in accordance with the present disclosure.

FIG. 5 depicts an illustrative file and a corresponding hash locations for fingerprinting the file in accordance with the present disclosure. A file 502 can be processed in order to determine the different locations of the file to include in the different hash passes. A read profile determination functionality 504 can process the file metadata, such as the file size and type. The metadata may be read in a first probe pass. As depicted by the file representation 506, the different hash passes may be performed on different locations within the file. For example, the first hash pass 508 may be generated from a header portion 510a of the file, which may also be read to provide the file metadata, as well as a trailer portion 510b. A second hash pass 512 may be formed from a plurality of different striped portions of the file 514a-514d. Each of a number of block hashes 516a-516d may be generated from respective blocks 518a-518d of the file. The generated hashes, whether it is only the first pass hash or all of the hashes, may then be concatenated together into the fingerprint.

FIG. 6A and 6B depict illustrative fingerprints of a file. The fingerprint 602a shown in FIG. 6A and the fingerprint 602b shown in FIG. 6B are for the same file, with identical content. However, the fingerprint 602a includes all of the hashes while the fingerprint 602b includes only the first 3 hashes. As depicted fingerprint 602a comprises fingerprint metadata 604a that includes version ID, a timestamp of when the fingerprint was generated, or when the file was accessed that caused the fingerprint to be generated. The fingerprint metadata 604a may also include a file ID identifying the file of the fingerprint. Similarly, the fingerprint 602b includes the same metadata 604b although the timestamps differ. As can be seen the first hashes 606a and 606b match each other, the second hashes 608a and 608b match each other and the third hash, or the first block hash, 610a and 610b match. Accordingly, it can be seen that at least a portion of the files are the same. However, since the two last block hashes 614b and 616b of the second fingerprint were not computed they cannot be compared and as such it cannot be guaranteed that the fingerprints are from identical files, although given the matching hashes it is likely the files are identical.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the system and method described herein may be provided by various combinations of software, firmware and/or hardware, other than the specific implementations described herein as illustrative examples.

What is claimed is:

1. A method comprising:
generating, based on metadata of a file, a read profile associated with the file, the read profile comprising a nominal number of hash passes, wherein the nominal number of hash passes is at least two;
generating a number of hashes according to the read profile, wherein the generated number of hashes is equal to the nominal number of hash passes; and
generating a file fingerprint associated with the file, the file fingerprint comprising the generated number of hashes.

2. The method of claim 1, further comprising, after generating the number of hashes, determining to generate a next hash according to the read profile.

3. The method of claim 2, wherein determining to generate the next hash is based on one or more of:
available computer resources;
input/output load; and
network performance.

4. The method of claim 1, wherein the read profile specifies portions of the file to use to generate the number of hashes.

5. The method of claim 4, wherein generating the number of hashes comprises generating, based on the read profile, a probe hash pass and one or more of a stripe pass hash and a block hash.

6. The method of claim 1, further comprising, prior to generating the read profile, selecting the file from an ordered list of a plurality of files.

7. The method of claim 6, wherein new files are added to the ordered list when the new files are accessed.

8. The method of claim 1, wherein the file fingerprint further comprises a version identifier associated with the file fingerprint.

9. The method of claim 1, further comprising storing the file fingerprint.

10. A system comprising:
a processor for executing instructions; and
a memory storing instructions which, when executed, cause the processor to:
generate, based on metadata of a file, a read profile associated with the file, the read profile comprising a nominal number of hash passes, wherein the nominal number of hash passes is at least two;
generate a number of hashes according to the read profile, wherein the generated number of hashes is equal to the nominal number of hash passes; and
generate a file fingerprint associated with the file, the file fingerprint comprising the generated number of hashes.

11. The system of claim 10, wherein the instructions, when executed, further cause the processor to, after generating the number of hashes, determine to generate a next hash according to the read profile.

12. The system of claim 11, wherein determining to generate the next hash is based on one or more of:
available computer resources;
input/output load; and
network performance.

13. The system of claim 10, wherein the read profile specifies portions of the file to use to generate the number of hashes.

14. The system of claim 13, wherein generating the number of hashes comprises generating, based on the read profile, a probe hash pass and one or more of a stripe pass hash and a block hash.

15. The system of claim 10, wherein the instructions, when executed, further cause the processor to, prior to generating the read profile, select the file from an ordered list of a plurality of files.

16. The system of claim 15, wherein new files are added to the ordered list when the new files are accessed.

17. The system of claim 10, wherein the file fingerprint further comprises a version identifier associated with the file fingerprint.

18. The system of claim 10, wherein the instructions, when executed, further cause the processor to store the generated file fingerprint.

19. A computer program product comprising:
a non-transitory computer-readable storage medium having computer-readable program code embodied therewith, the computer-readable program code configured, when executed by a processor, to execute a method, the method comprising:
generating, based on metadata of a file, a read profile associated with the file, the read profile comprising a nominal number of hash passes, wherein the nominal number of hash passes is at least two;
generating a number of hashes according to the read profile, wherein the generated number of hashes is equal to the nominal number of hash passes; and
generating a file fingerprint associated with the file, the file fingerprint comprising the generated number of hashes.

20. The computer program product of claim 19, further comprising, after generating the number of hashes, determining to generate a next hash according to the read profile.

* * * * *